United States Patent
Gardner et al.

(10) Patent No.: US 8,947,772 B2
(45) Date of Patent: Feb. 3, 2015

(54) DURABLE, INORGANIC, ABSORPTIVE, ULTRA-VIOLET, GRID POLARIZER

(71) Applicant: Moxtek, Inc., Orem, UT (US)

(72) Inventors: Eric Gardner, Eagle Mountain, UT (US); Bin Wang, Orem, UT (US); Mark Davis, Springville, UT (US); John D. Dredge, Jr., Cedar Hills, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 14/198,335

(22) Filed: Mar. 5, 2014

(65) Prior Publication Data

US 2014/0313571 A1     Oct. 23, 2014

Related U.S. Application Data

(63) Continuation of application No. 11/767,361, filed on Jun. 22, 2007, now Pat. No. 8,755,113, which is a continuation-in-part of application No. 11/469,210, filed on Aug. 31, 2006, now abandoned, which is a continuation-in-part of application No. 11/469,226, filed on Aug. 31, 2006, now abandoned, which is a continuation-in-part of application No. 11/469,241, filed on Aug. 31, 2006, now abandoned, which is a continuation-in-part of application No. 11/469,253, filed on Aug. 31, 2006, now abandoned, which is a continuation-in-part of application No. 11/469,266, filed on Aug. 31, 2006, now abandoned.

(51) Int. Cl.
*G02B 5/30*     (2006.01)

(52) U.S. Cl.
CPC ............ *G02B 5/3075* (2013.01); *G02B 5/3058* (2013.01); *G02B 5/3091* (2013.01)
USPC . 359/352; 359/361; 359/485.05; 359/487.03; 359/489.06

(58) Field of Classification Search
USPC ........... 359/352, 361, 485.05, 487.03, 489.06
See application file for complete search history.

(56) References Cited

U.S. PATENT DOCUMENTS

| 2,224,214 A | 12/1940 | Brown |
| 2,287,598 A | 6/1942 | Brown |

(Continued)

FOREIGN PATENT DOCUMENTS

| CN | 1692291 | 11/2005 |
| DE | 3707984 A1 | 9/1988 |

(Continued)

OTHER PUBLICATIONS

Auton; et al.: Grib Polarizers for Use in the Near Infrared; Infrared Physics; 1972; pp. 95-100; vol. 12; Pergamon Press.

(Continued)

*Primary Examiner* — Ricky D Shafer
(74) *Attorney, Agent, or Firm* — Thorpe North & Western LLP

(57) ABSTRACT

An inorganic, dielectric grid polarizer device includes a stack of film layers disposed over a substrate. Each film layer is formed of a material that is both inorganic and dielectric. Adjacent film layers each have different refractive indices. At least one of the film layers is discontinuous to form a form-birefringent layer with an array of parallel ribs having a period less than 400 nm. Another layer, different than the form-birefringent layer, is formed of an optically absorptive material for the ultra-violet spectrum.

19 Claims, 8 Drawing Sheets

(56) References Cited

U.S. PATENT DOCUMENTS

| | | |
|---|---|---|
| 2,887,566 A | 5/1955 | Marks |
| 2,748,659 A | 6/1956 | Geffeken et al. |
| 3,046,839 A | 7/1962 | Bird et al. |
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,479,168 A | 11/1969 | Bird et al. |
| 3,536,373 A | 10/1970 | Bird et al. |
| 3,653,741 A | 4/1972 | Marks |
| 3,877,789 A | 4/1975 | Marie |
| 3,969,545 A | 7/1976 | Slocum |
| 4,009,933 A | 3/1977 | Firester |
| 4,049,944 A | 9/1977 | Garvin et al. |
| 4,068,260 A | 1/1978 | Ohneda et al. |
| 4,220,705 A | 9/1980 | Sugibuchi et al. |
| 4,289,381 A | 9/1981 | Garvin et al. |
| 4,456,515 A | 6/1984 | Krueger et al. |
| 4,512,638 A | 4/1985 | Sriram et al. |
| 4,514,479 A | 4/1985 | Ferrante |
| 4,515,441 A | 5/1985 | Wentz |
| 4,763,972 A | 8/1988 | Panchon et al. |
| 4,799,776 A | 1/1989 | Yamazaki et al. |
| 4,818,076 A | 4/1989 | Heppke et al. |
| 4,915,463 A | 4/1990 | Barbee, Jr. |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,061,050 A | 10/1991 | Ogura |
| 5,124,841 A | 6/1992 | Oishi |
| 5,157,526 A | 10/1992 | Kondo et al. |
| 5,177,635 A | 1/1993 | Kellmann |
| 5,235,449 A | 8/1993 | Imazeki et al. |
| 5,245,471 A | 9/1993 | Iwatsuka et al. |
| 5,279,689 A | 1/1994 | Shvartsman |
| 5,383,053 A | 1/1995 | Hegg et al. |
| 5,510,215 A | 4/1996 | Prince et al. |
| 5,559,634 A | 9/1996 | Weber |
| 5,619,356 A | 4/1997 | Kozo et al. |
| 5,748,368 A | 5/1998 | Tamada et al. |
| 5,890,095 A | 3/1999 | Barbour et al. |
| 5,912,762 A | 6/1999 | Li et al. |
| 5,973,833 A | 10/1999 | Booth et al. |
| 5,991,075 A | 11/1999 | Katsuraga |
| 6,081,376 A | 6/2000 | Hansen et al. |
| 6,122,103 A | 9/2000 | Perkins et al. |
| 6,208,463 B1 | 3/2001 | Hansen et al. |
| 6,234,634 B1 | 5/2001 | Hansen et al. |
| 6,243,199 B1 | 6/2001 | Hansen et al. |
| 6,251,297 B1 | 6/2001 | Komuro et al. |
| 6,288,840 B1 * | 9/2001 | Perkins et al. ........... 359/485.03 |
| 6,291,797 B1 | 9/2001 | Koyama et al. |
| 6,424,436 B1 | 7/2002 | Yamanaka |
| 6,426,837 B1 | 7/2002 | Clark et al. |
| 6,496,239 B2 | 12/2002 | Seiberle |
| 6,532,111 B2 | 3/2003 | Kurtz et al. |
| 6,654,168 B1 | 11/2003 | Borrelli |
| 6,665,119 B1 | 12/2003 | Kurtz |
| 6,714,350 B2 | 3/2004 | Silverstein |
| 6,785,050 B2 | 8/2004 | Lines et al. |
| 6,809,864 B2 | 10/2004 | Martynov et al. |
| 6,811,274 B2 | 11/2004 | Olczak |
| 6,813,077 B2 | 11/2004 | Borrelli et al. |
| 6,816,290 B2 | 11/2004 | Mukawa |
| 6,844,971 B2 | 1/2005 | Silverstein |
| 6,927,915 B2 | 8/2005 | Nakai |
| 6,943,941 B2 | 9/2005 | Flagello et al. |
| 6,972,906 B2 | 12/2005 | Hasman et al. |
| 7,009,768 B2 | 3/2006 | Sakamoto |
| 7,046,441 B2 | 5/2006 | Huang et al. |
| 7,046,442 B2 | 5/2006 | Suganuma |
| 7,050,233 B2 | 5/2006 | Nikolov et al. |
| 7,075,722 B2 | 7/2006 | Nakai |
| 7,085,050 B2 | 8/2006 | Florence |
| 7,113,335 B2 | 9/2006 | Sales |
| 7,116,478 B2 | 10/2006 | Momoki et al. |
| 7,129,183 B2 | 10/2006 | Mori et al. |
| 7,142,363 B2 | 11/2006 | Sato et al. |
| 7,155,073 B2 | 12/2006 | Momoki et al. |
| 7,158,302 B2 | 1/2007 | Chiu et al. |
| 7,203,001 B2 | 4/2007 | Deng et al. |
| 7,220,371 B2 | 5/2007 | Suganum |
| 7,221,501 B2 | 5/2007 | Flagello et al. |
| 7,227,684 B2 | 6/2007 | Wang et al. |
| 7,233,563 B2 | 6/2007 | Ueki et al. |
| 7,236,655 B2 | 6/2007 | Momoki et al. |
| 7,256,938 B2 | 8/2007 | Barton et al. |
| 7,268,946 B2 | 9/2007 | Wang |
| 7,375,887 B2 | 5/2008 | Hansen |
| 7,414,784 B2 | 8/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,692,860 B2 | 4/2010 | Sato et al. |
| 7,722,194 B2 | 5/2010 | Amako et al. |
| 7,755,718 B2 | 7/2010 | Amako et al. |
| 7,800,823 B2 | 9/2010 | Perkins |
| 7,944,544 B2 | 5/2011 | Amako et al. |
| 7,961,393 B2 * | 6/2011 | Perkins et al. ........... 359/485.05 |
| 8,009,355 B2 | 8/2011 | Nakai |
| 8,049,841 B2 | 11/2011 | Sugita et al. |
| 8,426,121 B2 | 4/2013 | Brueck et al. |
| 8,611,007 B2 | 12/2013 | Davis |
| 8,755,113 B2 * | 6/2014 | Gardner et al. ............ 359/352 |
| 2001/0053023 A1 | 12/2001 | Kameno et al. |
| 2002/0015135 A1 | 2/2002 | Hansen |
| 2002/0040892 A1 | 4/2002 | Koyama et al. |
| 2002/0191286 A1 | 12/2002 | Gale et al. |
| 2003/0161029 A1 | 8/2003 | Kurtz et al. |
| 2003/0224116 A1 | 12/2003 | Chen et al. |
| 2004/0008416 A1 | 1/2004 | Okuno |
| 2004/0047039 A1 | 3/2004 | Wang et al. |
| 2004/0047388 A1 | 3/2004 | Wang et al. |
| 2004/0141108 A1 | 7/2004 | Tanaka et al. |
| 2004/0169924 A1 * | 9/2004 | Flagello et al. ............ 359/486 |
| 2004/0174596 A1 | 9/2004 | Umeki |
| 2004/0201890 A1 | 10/2004 | Crosby |
| 2004/0258355 A1 | 12/2004 | Wang et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0122587 A1 | 6/2005 | Oudekirk |
| 2005/0190445 A1 | 9/2005 | Fukuzaki |
| 2005/0195485 A1 | 9/2005 | Hirai et al. |
| 2005/0259324 A1 | 11/2005 | Flagello et al. |
| 2005/0275944 A1 | 12/2005 | Wang et al. |
| 2005/0277063 A1 | 12/2005 | Wang et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0113279 A1 | 6/2006 | Little |
| 2006/0127830 A1 | 6/2006 | Deng et al. |
| 2006/0215263 A1 | 9/2006 | Mi et al. |
| 2007/0183035 A1 | 8/2007 | Asakawa et al. |
| 2007/0217008 A1 | 9/2007 | Wang et al. |
| 2007/0242187 A1 | 10/2007 | Yamaki et al. |
| 2007/0242352 A1 | 10/2007 | MacMaster |
| 2007/0297052 A1 | 12/2007 | Wang et al. |
| 2008/0037101 A1 | 2/2008 | Jagannat |
| 2008/0038467 A1 | 2/2008 | Jagannat |
| 2008/0055549 A1 | 3/2008 | Perkins et al. |
| 2008/0055719 A1 | 3/2008 | Perkins |
| 2008/0055720 A1 | 3/2008 | Perkins |
| 2008/0055721 A1 | 3/2008 | Perkins |
| 2008/0055722 A1 | 3/2008 | Perkins |
| 2008/0316599 A1 | 12/2008 | Wang et al. |
| 2009/0009865 A1 | 1/2009 | Nishida et al. |
| 2009/0041971 A1 | 2/2009 | Wang et al. |
| 2009/0053655 A1 | 2/2009 | Deng et al. |
| 2009/0109377 A1 | 4/2009 | Sawaki et al. |

(56) References Cited

U.S. PATENT DOCUMENTS

| | | |
|---|---|---|
| 2009/0231702 A1 | 9/2009 | Wu et al. |
| 2010/0103517 A1 | 4/2010 | Davis et al. |
| 2010/0328768 A1 | 12/2010 | Lines |
| 2011/0080640 A1 | 4/2011 | Kaida et al. |
| 2011/0096396 A1 | 4/2011 | Kaida et al. |
| 2012/0075699 A1 | 3/2012 | Davis |
| 2013/0077164 A1 | 3/2013 | Davis |
| 2013/0201557 A1 | 8/2013 | Davis |
| 2013/0250411 A1 | 9/2013 | Bangerter et al. |
| 2013/0258471 A1 | 10/2013 | Davis |

FOREIGN PATENT DOCUMENTS

| | | |
|---|---|---|
| DE | 10327963 | 1/2005 |
| DE | 10341596 | 4/2005 |
| DE | 102004041222 A1 * | 3/2006 |
| JP | S58-042003 | 3/1983 |
| JP | H03-084502 | 4/1991 |
| JP | H06-174907 | 6/1994 |
| JP | H07-005316 | 1/1995 |
| JP | H09-090122 | 4/1997 |
| JP | H09-090129 | 4/1997 |
| JP | H09-178943 | 7/1997 |
| JP | H09-212896 | 8/1997 |
| JP | H09-288211 | 11/1997 |
| JP | H10-073722 A | 3/1998 |
| JP | H10-153706 | 6/1998 |
| JP | H11-014814 | 1/1999 |
| JP | H11-142650 | 5/1999 |
| JP | H11-174396 | 7/1999 |
| JP | H11-237507 | 8/1999 |
| JP | H11-306581 | 11/1999 |
| JP | 2000-284117 | 10/2000 |
| JP | 2001-074935 | 3/2001 |
| JP | 2002-116302 | 4/2002 |
| JP | 2004-157159 | 6/2004 |
| JP | 2004-309903 | 11/2004 |
| JP | 2005-195824 | 7/2005 |
| JP | 2006-133402 | 5/2006 |
| JP | 2006-201540 | 8/2006 |
| JP | 2007-101859 | 4/2007 |
| JP | 2006-047813 | 2/2008 |
| KR | 1020050017871 | 2/2005 |
| KR | 100707083 | 4/2007 |
| RU | 1781659 | 12/1992 |
| SU | 1283685 | 1/1987 |
| WO | WO 03/069381 | 8/2003 |
| WO | WO 2004/013684 | 2/2004 |
| WO | WO 2005/101112 | 10/2005 |
| WO | WO 2006/036546 | 4/2006 |

OTHER PUBLICATIONS

Auton; Infrared Transmission Polarizes by Photolithography; Applied Optics; Jun. 1967; pp. 1023-1027; vol. 6, No. 6.

Bass et al. (eds.); Handbook of Optics; 1995; pp. 3.32-3.35; vol. II, Second Edition; McGraw-Hill, Inc.

Baur; A new type of beam splitting polarizer cube; Meadowlark Optics; 2005; pp. 1-9; Meadowlark Optics, Inc.

Bird: et al.: The Wire Grid as a Near-Infrared Polarizer; Journal of the Optical Society of America; Sep. 1960; 6 pages; vol. 50, No. 9; The Optical Society of America.

Deng et al.: Multiscale structures for polarization control by using imprint and UV lithography: Proceedings of SPIE; 2005; pp. 1-12; vol. 6003.

Deng et al.: Wideband antireflective polarizes based on integrated diffractive multilayer microstructures; Optics Letters; Feb. 1, 2006;; pp. 344-346; vol. 31, No. 3.

Driscoll et al.; Handbook of Optics; 1978; pp. 10-68-10-77; McGraw-Hill, Inc.

Flanders; Application of =100 A linewidth structures fabricated by shadowing techniques; J. Vac. Sci. Technol.; Nov./Dec. 1981; 5 pages; vol. 19, No. 4; American Vacuum Society.

Flanders: Submircon periodicity gratings as artificial anisotropic dielectrics: Appl. Phys. Lett.: Mar. 15, 1983: pp. 492-494; vol. 42, No. 6; American Institute of Physics.

Hass et al.; Sheet Infrared Transmission Polarizes; Applied Optics; Aug. 1965; pp. 1027-1031; vol. 4, No. 8.

Knop; Reflection Grating Polarizer for the Infrared; Optics Communications; Sep. 1978; pp. 281-281; vol. 26, No. 3.

Li Li et al.; Visible broadband, wide-angle, thin-film multilayer polarizing beam splitter; Applied Optics; May 1, 1996; pp. 2221-2224; vol. 35, No. 13; Optical Society of America.

Lopez et al.; Wave-plate polarizing beam splitter based on a form-birefringent multilayer grating; Optics Letters; Oct. 15, 1998; pp. 1627-1629; vol. 23, No. 20.

Richter; et al.: Design considerations of form birefringent microstructures: Applied Optics; May 10, 1995; pp. 2421-2429; vol. 34, No. 14; Optical Society of America.

Savas et al.; Achromatic interferometric lithography for 100-nm-period gratings and grids; Journal Vac. Sci, Technology B; Nov./Dec. 1995; pp. 2732-2735; vol. 13, No. 6; American Vacuum Society.

Sonek et al.; Ultraviolet grating polarizers; J. Vac. Sci. Technol.; Nov./Dec. 1981; pp. 921-923; vol. 19, No. 4; American Vacuum Society.

Steinkamp et al.; Grid Polarizer for the visible spectral region; SPIE; pp. 288-296; vol. 2213.

Tyan et al; Design, fabrication, and characterization of form-birefringent multilayer polarizing beam splitter; Journal of the Optical Society of America A; Jul. 1997; pp. 1627-1636; vol. 14, No. 7; Optical Society of America.

Wang et al.: Innovative High-Performance Nonowire-Grid Polarizers and Integrated Isolators; IEEE Journal of Selected Topics in Quantum Electronics; Jan./Feb. 2005; pp. 241-253; vol. 11, No. 1.

* cited by examiner

DURABLE, INORGANIC, ABSORPTIVE, ULTRA-VIOLET, GRID POLARIZER

PRIORITY CLAIM

This is a continuation of U.S. patent application Ser. No. 11/767,361, filed on Jun. 22, 2007; which is a continuation-in-part of U.S. patent application Ser. Nos. 11/469,210; 11/469,226; 11/469,241; 11/469,253 and Ser. No. 11/469,266, filed on Aug. 31, 2006; which are herein incorporated by reference.

BACKGROUND

1. Field of the Invention

The present invention relates generally to an inorganic, dielectric, absorptive grid polarizer with particular focus on such a polarizer for use in the ultra-violet (UV) portion of the electromagnetic spectrum.

2. Related Art

Various types of polarizers or polarizing beam splitters (PBS) have been developed for polarizing light, or separating orthogonal polarization orientations of light. A MacNeille PBS is based upon achieving Brewster's angle behavior at the thin film interface along the diagonal of the high refractive index cube in which it is constructed. Such MacNeille PBSs generate no astigmatism, but have a narrow acceptance angle, and have significant cost and weight. Such devices can be fabricated to function from the infra-red through the visible to the ultra-violet region of the electromagnetic spectrum by appropriate choices of glasses and thin-films.

Other types of polarizers are also available for the visible and infra-red portions of the spectrum, including long-chain polymer polarizers, wire-grid polarizers, Glan Thompson crystal polarizers, etc. However, the ultra-violet (UV) portion of the spectrum, especially for wavelengths less than approximately 350 nm, is not similarly well-supplied with capable, high-performance polarizers.

This scarcity of capable polarizers has limited the applications of polarized UV light in science, technology, and industry in comparison to the visible and infra-red (IR). The need for UV polarizers, however, is becoming acute in order to support the increasing applications of UV irradiation in industrial processes such as semiconductor manufacturing, flat panel Liquid Crystal Display (LCD) manufacturing, etc. The type of polarizer needed in some UV irradiation processes must have a reasonable acceptance angle, must be able to deliver a transmitted contrast ratio above approximately 20:1, and a transmission efficiency above about 30% of the desired polarization, and survive for a useful period of time (at least 1-2 months) in a high intensity environment. It is also desired that the polarizer have a convenient form factor such as a plate format which allows for the most efficient optical geometries to be used. While such a level of performance in the visible spectrum could easily be met by wire-grid polarizer technology or several other polarization technologies, it has proven surprisingly hard to meet even this low performance requirement in the UV.

One solution to this need has been to use a "pile-of-plates" polarizer which is formed by assembling a series of glass plates and positioning the pile at Brewster's angle to the UV irradiation to create a polarized beam through transmission of the P-polarization and reflection of the S-polarization. This approach can deliver the desired optical efficiency and contrast ratio, but it is prohibitively expensive and bulky, and has not proved to be a practical solution.

It had been thought that aluminum wire-grid polarizers similar to those commercially-available for use in the visible and IR would serve to meet this need. Experience, however, has shown that the current state of the art in wire-grid technology is insufficient. Wire-grid polarizers with a grid period down to approximately 100 nm from several manufacturers have been tested in UV applications between 240 nm and 300 nm wavelength and have not been able to meet all the above requirements. In particular, they have not been able to deliver the desired contrast levels for a useful period of time. The fundamental problems appear to be the short wavelength in comparison to the grid period (a ratio of only 2.5:1 at 250 nm) which negatively impacts the contrast and transmission performance, and the harshness of the industrial UV environment which quickly (such as in a matter of a few hours) transforms the aluminum metal wires in the grid into aluminum oxide wires, at which point the polarizer loses its polarization function almost entirely.

Another proposal has been to simply add a separate absorptive layer near a wire-grid polarizer or coating a wire-grid polarizer with an absorptive layer. See U.S. Pat. No. 7,206,059. But such a polarizer uses wires.

Other UV polarizers, such as the Glan Thompson Alpha BBO, while satisfactory in scientific applications, cannot meet the requirements on optical efficiency, acceptance angle, and are also prohibitively expensive for industrial applications. Thus, there does not exist today a fully acceptable and practical UV polarizer that meets the needs of industrial applications of UV light.

SUMMARY OF THE INVENTION

It has been recognized that it would be advantageous to develop a polarizer or polarizing beam splitter that has a contrast in transmission and/or reflection greater than about 20:1, that has a reasonable acceptance angle, that can withstand high temperatures and the higher-energy photons inherent in UV light for significant periods of time, that has a reasonable physical format, such as a plate format, and that can be manufactured at a reasonable cost for application in industrial processes. In addition, it has been recognized that it would be advantageous to develop a polarizer that is inorganic and dielectric, in order to avoid oxidation of the metals, such as aluminum, and destruction of organic materials, such as polymers, by the intense UV environment.

The invention provides an absorptive, ultra-violet, inorganic and dielectric grid polarizer device. A stack of at least two layers is disposed over a substrate. Each of the at least two layers is formed of a material that is both inorganic and dielectric. Adjacent layers of the at least two layers have different refractive indices. At least one of the at least two layers is discontinuous to form a form-birefringent layer with an array of parallel ribs having a period less than approximately 400 nm. Another of the at least two layers, different than the form-birefringent layer, is formed of an optically absorptive material for the ultra-violet spectrum defining an absorptive layer.

In another aspect, the invention provides an absorptive, ultra-violet, inorganic and dielectric grid polarizer device with a stack of at least two layers disposed over a substrate. Each of the at least two layers is formed of a material that is both inorganic and dielectric. Adjacent layers of the at least two layers have different refractive indices. The at least two layers are discontinuous to form an array of parallel ribs with a period less than approximately 400 nm. Each rib has a transmission layer formed of optically non-absorptive material to the ultra-violet spectrum; and an absorbing layer formed of an optically absorptive material to the ultra-violet spectrum.

In accordance with another aspect, the invention provides an absorptive, ultra-violet, inorganic and dielectric grid polarizer device with a stack of at least two layers disposed over a substrate. Each layer of the stack is formed of a material that is both inorganic and dielectric. Adjacent layers of the stack have different refractive indices. All of the layers of the stack are discontinuous to form form-birefringent layers with an array of parallel ribs having a period less than approximately 400 nm. The period and the different refractive indices cause the stack to substantially polarize an incident ultra-violet beam into two orthogonal polarization orientations and transmitting or reflecting one of the polarizations. At least one of the layers of the stack is formed of an optically absorptive material for the ultra-violet spectrum to substantially absorb another of the polarization orientations.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1b is a Scanning Electron Image of an example of the polarizer of FIG. 1a;

FIG. 1c is a graph of expected performance (calculated theoretically) of the polarizer of FIG. 1a;

FIG. 1f is a graph of actual performance of the polarizer of FIG. 1a;

FIG. 3b is a graph of expected performance (calculated theoretically) of the polarizer of FIG. 3a;

FIG. 4b is a graph of expected performance (calculated theoretically) of the polarizer of FIG. 4a;

FIG. 5b is a Scanning Electron Image of an example of the polarizer of FIG. 5a;

FIG. 5c is a graph of expected performance (calculated theoretically) of the polarizer of FIG. 5a;

FIG. 7 is a schematic view of a method of making a polarizer of FIG. 1a; and

Various features in the figures have been exaggerated for clarity.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term dielectric is used herein to mean non-metallic optical materials, typically consisting of metal oxides, metal nitrides, metal fluorides, or other similar materials. In addition, carbon in its various forms such as graphite, diamond, glassy carbon, etc. is considered a dielectric within the scope of this invention.

Description

As described above, it has been recognized that there is a need for an improved polarizer, particularly for ultra-violet (UV) applications. Since even inorganic polarizers, such as wire-grid polarizers, have not been successful in meeting this particular need in the UV spectrum, it is useful to look at the application requirements in order to develop a polarizer that may work uniquely in the UV spectrum that might otherwise not be interesting or useful in other portions of the electromagnetic spectrum. In particular, it should be noted that the requirements for contrast ratio and transmission efficiency in some UV applications are much lower than would be considered an acceptable level of performance for applications in the visible or the infrared (IR) spectrums. This opens up the possibility to use more creative approaches, perhaps even involving absorptive materials which would not typically be considered in visible or IR applications because of their strong negative impact on over-all optical efficiency.

Figure 1A:
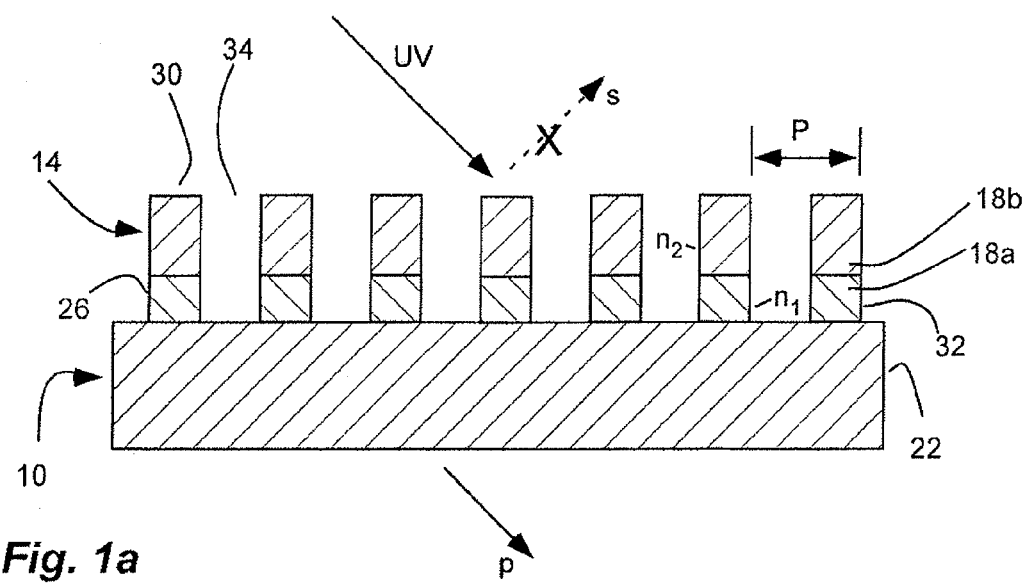
FIG. 1a is a cross-sectional schematic side view of an absorptive, inorganic and dielectric grid polarizer in accordance with an embodiment of the present invention.
Figure 1B:
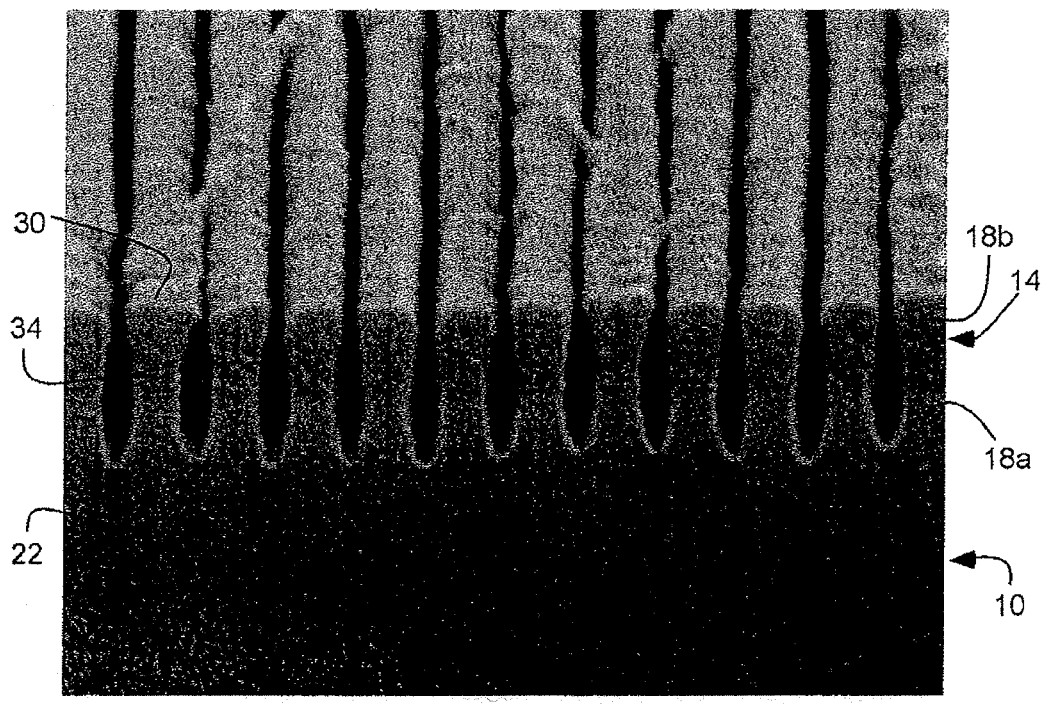

As illustrated in FIGS. 1a and 1b, an absorptive, inorganic and dielectric grid polarizer, indicated generally at 10, is shown in an exemplary implementation in accordance with the present invention. The polarizer 10 can be configured to substantially polarize an incident UV light beam (indicated by "UV") into substantially separate orthogonal polarization orientations, and to substantially absorb one of the polarizations. For example, the polarizer can be configured to transmit one polarization orientation, such as UV light with p-polarization orientation, and absorb the other polarization orientation, such as UV light with s-polarization orientation, as shown in FIG. 1a. The s-polarization orientation can be oriented parallel with the ribs of the polarizer, as described below, while the p-polarization orientation can be oriented orthogonal or perpendicular to the ribs. Such a polarizer 10 can be utilized in the fields of semiconductor manufacturing, flat panel liquid crystal display (LCD) manufacturing, etc.

The polarizer 10 can include a stack 14 of film layers 18a and 18b disposed over a substrate 22 that carries and supports the layers. The stack 14 includes at least two layers, including at least one transmitting or non-optically absorptive layer 18a and at least one optically absorbing layer 18b with respect to the ultra-violet spectrum. The transmitting layer 18a can be directly disposed on the substrate, or positioned closer to the substrate than the absorbing layer 18b, so that the transmitting layer is disposed between the absorptive layer and the substrate. The layers 18a and 18b can be formed of inorganic and dielectric materials. The inorganic and dielectric materials of the polarizer resist degradation, such as oxidation, from the UV beam. In addition, the substrate 22 can be formed of an inorganic and dielectric material, such as fused silica to further avoid degradation of the substrate by UV light. Thus, the entire polarizer can be inorganic and dielectric, or formed of only inorganic and dielectric materials.

The transmitting layer 18a can also be formed of a material that is optically transmissive in at least the UV spectral region. Similarly, the substrate can be formed of a material that is optically transmissive to the UV spectral region.

At least the transmitting layer 18a can be discontinuous to form a form-birefringent layer 26 with an array of parallel ribs 30 defining a grid 32. The ribs 30 are formed of an inorganic and dielectric material, such as silicon dioxide (SiO2). In one aspect, the ribs 30 have a period P less than the wavelength of the UV beam, or less than 400 nm. In another aspect, the ribs 30 or grid 32 has a period P less than half the wavelength of the UV beam, or less than 200 nm. In another aspect, the ribs or grid can have a period P of less than 160 nm. The structure (period, width, thickness, and different refractive indices of adjacent layers) of the ribs 30 interacts with the UV beam to substantially polarize the UV beam into two orthogonal polarization orientations. In one aspect, the grid 32 substantially transmits one of the polarization orientations, such as the p-polarization orientation, while the other polarization orientation, such as the s-polarization orientation, is substantially absorbed, as described below. Alternatively, the grid can substantially reflect the s-polarization orientation while the p-polarization orientation is substantially absorbed.

The absorptive layer 18b includes an optically absorptive material for the UV spectral region, such as titanium dioxide (TiO2). Thus, the absorptive layer 18b substantially absorbs one of the polarization orientations of the UV beam, such as the s-polarization orientation. The absorptive layer 18b can also be discontinuous with an array of parallel ribs 30 forming part of the grid 32. Forming the absorptive layer 18b as a grid 32 can facilitate manufacture by allowing all the layers to be etched at once, as described in greater detail below. The optically absorptive material of absorptive layer can include: cadmium telluride, germanium, lead telluride, silicon oxide, tellurium, titanium dioxide, silicon, cadmium sulifide, zinc selenide, zinc sulfide, and combinations thereof.

The material of each layer or grid has a refractive index n or effective refractive index. Adjacent layers or grids have different refractive indices ($n_1 \neq n_2$) or different effective refractive indices. In addition, the first layer 18a can have a different refractive index $n_1$ than the refractive index $n_s$ of the substrate 22 ($n_1 \neq n_s$). The stack of layers can have a basic pattern of two layers with two refractive indices, two thicknesses (which may or may not be different), and two different materials, with one of the materials exhibiting optical absorption in the spectral region of interest in the UV spectrum. This basic pattern can be repeated to make structures with more than one layer pair. It will also be appreciated that other layers of continuous optical thin-film materials (not shown) can be added underneath the layer pair or over the layer pair to provide other optical benefits.

In addition, the thickness of each layer can be tailored to optimize the optical performance (transmission efficiency and contrast ratio) for the desired spectral range in the UV spectrum. For example, as shown in FIG. 1a, the thickness $t_1$ of the transmissive layer 18a is less than the thickness $t_2$ of the absorbing layer 18b.

While the stack 14 is shown with two film layers 18a-b, it will be appreciated that the number of film layers in the stack can vary. In one aspect, the stack can have between three and twenty layers. It is believed that less than twenty layers can achieve the desired polarization. The thickness of all the film layers in the stack over the substrate can be less than 2 micrometers.

The two-layer film is discontinuous to form a form-birefringent structure with an array of parallel ribs 30. The ribs have a pitch or period P less than the wavelength being treated, and in one aspect less than half the wavelength being treated. For UV light applications ($\lambda \approx 100\text{-}400$ nm) the ribs can have a pitch or period less than 400 nm in one aspect, less than 200 nm in another aspect, and less than 160 nm in another aspect. Thus, the polarizer 10 separates an incident UV light beam into two orthogonal polarization orientations, with light having s-polarization orientation (polarization orientation oriented parallel to the length of the ribs) being mostly absorbed with some energy reflected, and light having p-polarization orientation (polarization orientation oriented perpendicular to the length of the ribs) being largely transmitted or passed with a small amount of energy absorbed. (It is of course understood that the separation of these two polarizations may not be perfect and that there may be losses or amounts of undesired polarization orientation either reflected and/or transmitted.) In addition, it will be noted that the grid or array of ribs with a pitch less than about half the wavelength of light does not act like a diffraction grating (which has a pitch larger than about half the wavelength of light). Thus, the grid polarizer avoids diffraction. Furthermore, it is believed that such periods also avoid resonant effects or other optical anomalies.

As shown in FIG. 1a, all of the film layers are discontinuous and form the array of parallel ribs 30. The ribs 30 can be separated by intervening grooves, gaps or troughs 34. In this case, the grooves 34 extend through both of the film layers 18a-18b to the substrate 22. Thus, each rib 30 is formed of two layers. In addition, all the film layers are form-birefringent. As discussed below, such a configuration can facilitate manufacture.

Although the ribs 30 are shown rectangular, it is of course understood that the ribs and grooves 34 can take on a variety of other shapes, as shown in FIG. 1b. For example, the ribs and troughs can be trapezoidal, rounded, partial sinusoids and so forth.

The grooves 34 can be unfilled, or filled with air (n=1). Alternatively, the grooves 34 can be filled with a material that is optically transmissive with respect to the incident UV light.

In one aspect, a thickness of all the film layers in the stack over the substrate is less than 1 micron. Thus, the grid polarizer 10 can be thin for compact applications.

It is believed that the birefringent characteristic of the film layers, and the different refractive indices of adjacent film layers, causes the grid polarizer 10 to substantially separate polarization orientations of incident light, substantially absorbing and reflecting light of s-polarization orientation, and substantially transmitting or passing light of p-polarization orientation with an acceptable amount of absorption. In addition, it is believed that the number of film layers, thickness of the film layers, and refractive indices of the film layers can be adjusted to vary the performance characteristics of the grid polarizer so long as at least one of the layers is absorptive to the incident UV light.

Figure 1C:
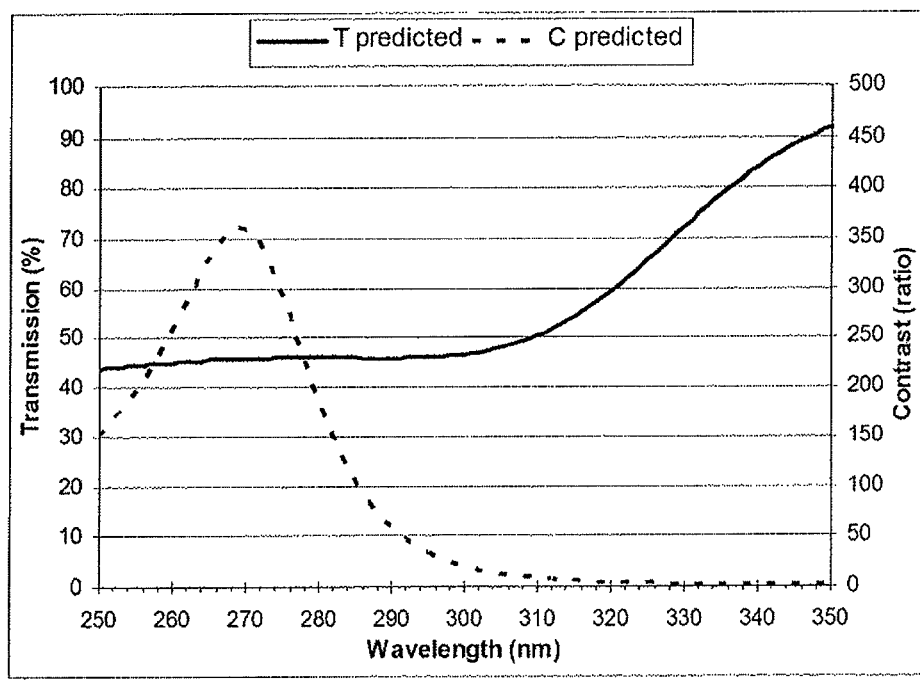

Referring to FIG. 1c, the predicted performance (specifically the transmission and contrast ratio) of the polarizer 10 of FIGS. 1a and 1b with a period of 120 nm is shown. It can be seen that the polarizer 10 has a transmission greater than 40% over the spectral range of 250-350 nm, with increased transmission above 310 nm. In addition, the contrast ratio peaks (at 350) at a wavelength of approximately 270 nm. Referring to FIG. 1e, the predicted performance of the polarizer 10 of FIGS. 1a and 1b with a period of 100 nm is shown. The transmission is greater than 30% and increases above 300 nm. In addition, the contrast peaks at 260 nm. Referring to FIG. 1d, the predicted performance of the polarizer 10 FIGS. 1a and 1b is shown with the ribs formed of Nb2O5. It can be seen that the polarizer has a transmission greater than 40% over the spectral range 250-350 nm, and increases above 290 nm. In addition, the contrast ratio peaks (at over 400) at wavelength of 250 nm. Thus, it can be seen that different materials can be chosen to tune the polarizer to a particular wavelength.

Figure 2:
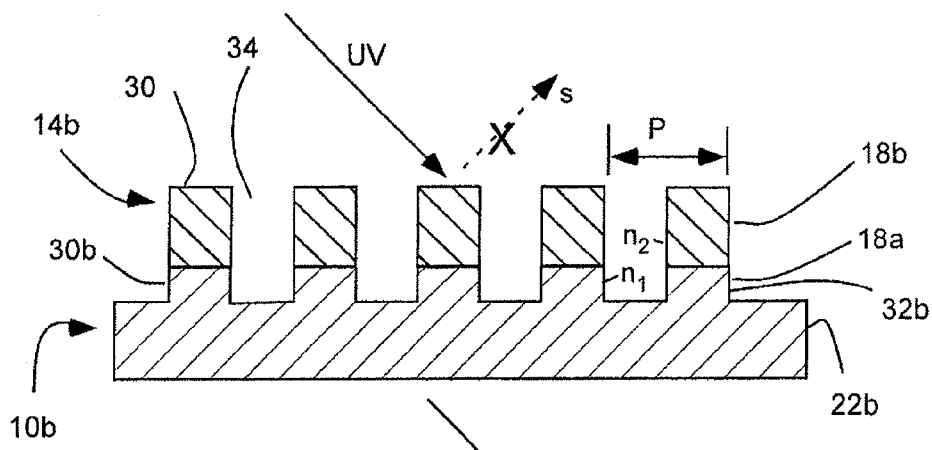
FIG. 2 is a cross-sectional schematic side view of another absorptive, inorganic and dielectric grid polarizer in accordance with another embodiment of the present invention.

Referring to FIG. 2, another absorptive, inorganic and dielectric grid polarizer, or polarizing beam splitter, indicated generally at 10b, is shown in an exemplary implementation in accordance with the present invention. The above description is incorporated by reference. The polarizing layer 18a, ribs 30b and grid 32b are formed integrally with the substrate 22b, such as by etching beyond the absorbing layer 18b into the substrate. Such a polarizer 10b may be easier to manufacture because it has fewer layers to be deposited. Thus, the polarizer includes a plurality of ribs formed in and extending from the substrate 22b itself. The ribs formed in the film layers or the stack 14b of film layers can be disposed over or carried by the ribs of the substrate. The ribs of the substrate can define intervening grooves or troughs that can be aligned with the grooves of the film layers. With this configuration, a portion of the substrate can form a form-birefringent layer. The ribs or grooves can be formed by etching the substrate, such as by over-etching the above layers.

Figure 3A:
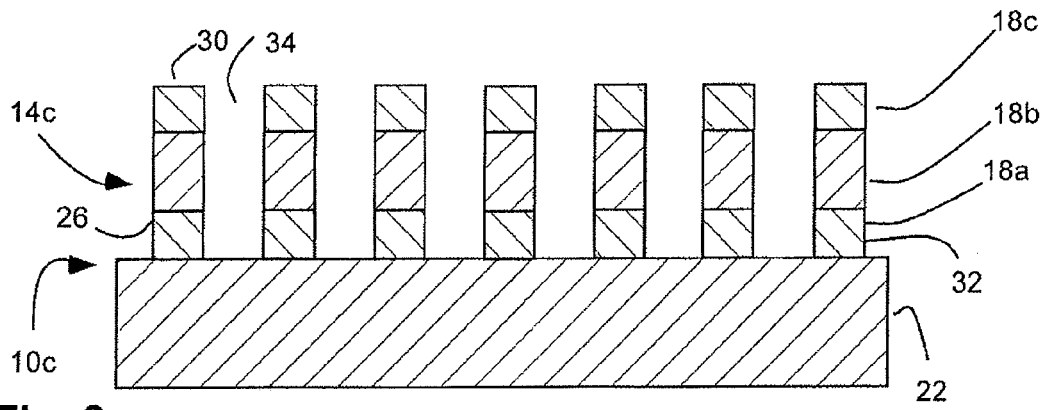
FIG. 3a is a cross-sectional schematic side view of another absorptive, inorganic and dielectric grid polarizer in accordance with another embodiment of the present invention.

Referring to FIG. 3a, another absorptive, inorganic and dielectric grid polarizer, or polarizing beam splitter, indicated generally at 10c, is shown in an exemplary implementation in accordance with the present invention. The above description is incorporated by reference. The polarizer 10c includes a stack 14c of discontinuous layers 18a-c. The top and bottom layers 18c and 18a can be transmissive layers and can be discontinuous to form form-birefringent layers 32 with arrays of ribs 30 defining a grid 26. An absorbing layer 18b can be disposed between the two polarizing grids.

stack 14d of discontinuous layers 18a-18f to form form-birefringent layers with an array of ribs 30 defining a grid. The layers can alternate between non-absorptive layers 18a, 18c and 18e and absorptive layers 18b, 18d and 18f.

Figure 4A:
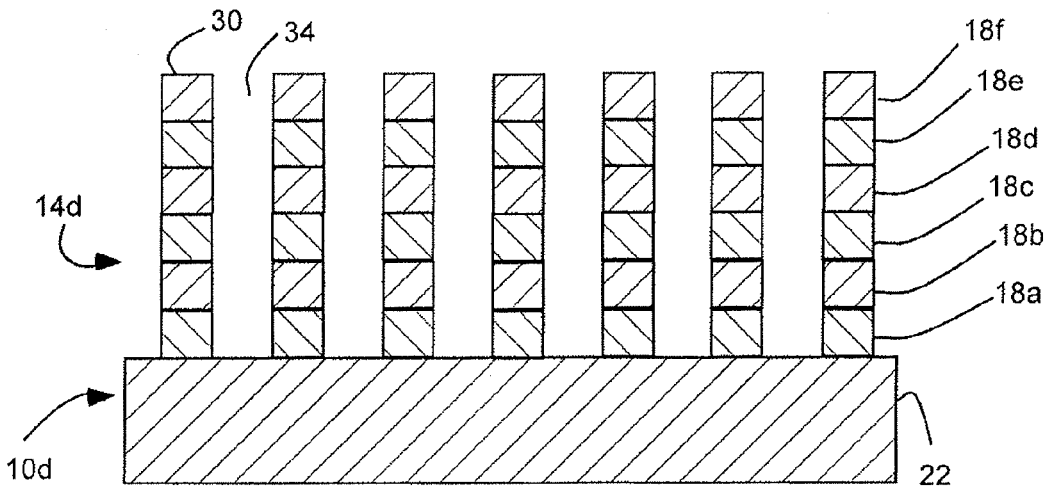
FIG. 4a is a cross-sectional schematic side view of another absorptive, inorganic and dielectric grid polarizer in accordance with another embodiment of the present invention.
Figure 4B:
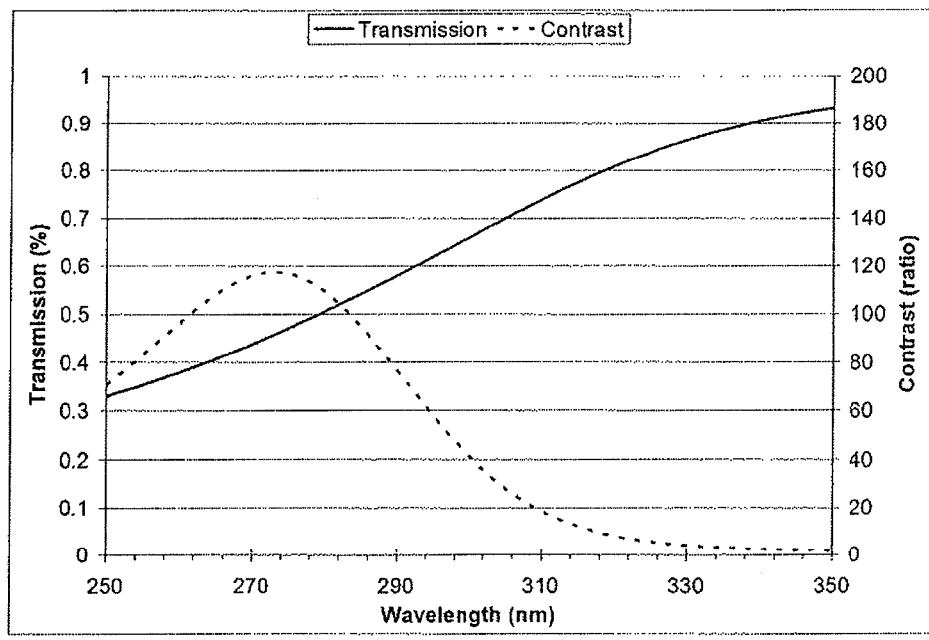

Referring to FIG. 4b, the predicted performance of the polarizer 10d of FIG. 4a is shown. It can be seen that the transmission is greater than 30 percent over the range 250-350 nm. In addition, the contrast peaks (at 120) at a wavelength of 270 nm.

Example 1

Referring to FIG. 1a, a first non-limiting example of an absorptive, inorganic and dielectric grid polarizer 10 is shown.

The grid polarizer 10 has two film layers 18a and 18b disposed over a substrate 22. The film layers are formed of inorganic and dielectric materials, namely a layer 18a of silicon dioxide ($SiO_2$) ($n \approx 1.6$, $k \approx 0$ at 266 nm) and a layer 18b of titanium dioxide ($TiO_2$)($n \approx 2.7$, $k \approx 1.3$ at 266 nm). The two layers have a thickness ($t_1$ and $t_2$) of 20 nm and 130 nm respectively. Thus, the entire stack has a thickness ($t_{total}$) of approximately 150 nm. Both of the thin film layers are discontinuous and form an array 26 of parallel ribs 30. Thus, all of the layers are discontinuous and together create form-birefringent layers. The ribs have a pitch or period P of 118 nm, and a duty cycle (ratio of period to rib width) of 0.48 or a rib width of 57 nm. The titanium oxide ($TiO_2$) material has been chosen because of its optical index and its optically absorptive properties for the incident UV radiation. The form-birefringent structure will preferentially reflect and absorb the s-polarization while transmitting the p-polarization with an acceptable amount of energy lost or absorbed. This desired performance will occur over a range of incident angles from about 0° incidence (or normal incidence) to an angle of about 75 degrees from normal.

Table 1 shows the performance for the polarizer 10 of FIG. 1a with incident UV light with a wavelength ($\lambda$) of 266 nm at angles of incidence of 0°, 15° and 30°.

TABLE 1

Example 1

| | Wavelength 266 nm Pitch, material | | | | | |
|---|---|---|---|---|---|---|
| | 120 nm, TiO2 | | | 40 nm, TiO2 | 120 nm, TiOx | 165 nm, TiO2 |
| Incident Angle | 0 | 15 | 30 | | 0 | |
| p-transmission (Tp) | 45.6% | 46.4% | 47.9% | 65.1% | 28.5% | 38.2% |
| p-reflection (Rp) | 5.5% | 4.3% | 1.7% | 0.60% | 0.25% | 1.7% |
| s-transmission (Ts) | 0.13% | 0.10% | 0.12% | 0.20% | 0.69% | 1.7% |
| s-reflection (Rs) | 18.6% | 19.4% | 22.1% | 17.4% | 7.5% | 15.0% |
| Contrast Transmission (T) | 344 | 447 | 413 | 331 | 41 | 22 |
| Contrast Reflection (R) | 3.4 | 4.5 | 13 | 29 | 3.0 | 8.9 |

Figure 3B:
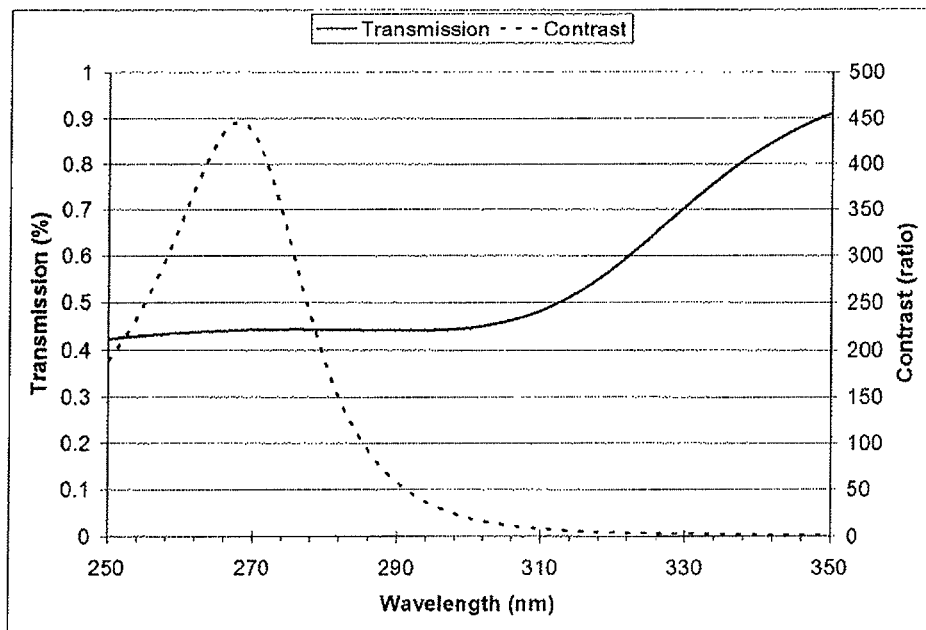

Referring to FIG. 3b, the predicted performance of the polarizer 10c of FIG. 3a is shown. It can be seen that the polarizer 10c is similar to that of the polarizer 10 of FIG. 1a.

Referring to FIG. 4a, another absorptive, inorganic and dielectric grid polarizer, or polarizing beam splitter, indicated generally at 10d, is shown in an exemplary implementation in accordance with the present invention. The above description is incorporated by reference. The polarizer 10d includes a From Table 1, it can be seen that the grid polarizer provides sufficient optical performance as described to be of great utility in the UV spectrum. In addition, it can be seen that the angular aperture of the polarizer extends over a range of at least ±30°. In addition, it can be seen that reducing the period of the ribs or grid increases the transmission.

Figure 1F:
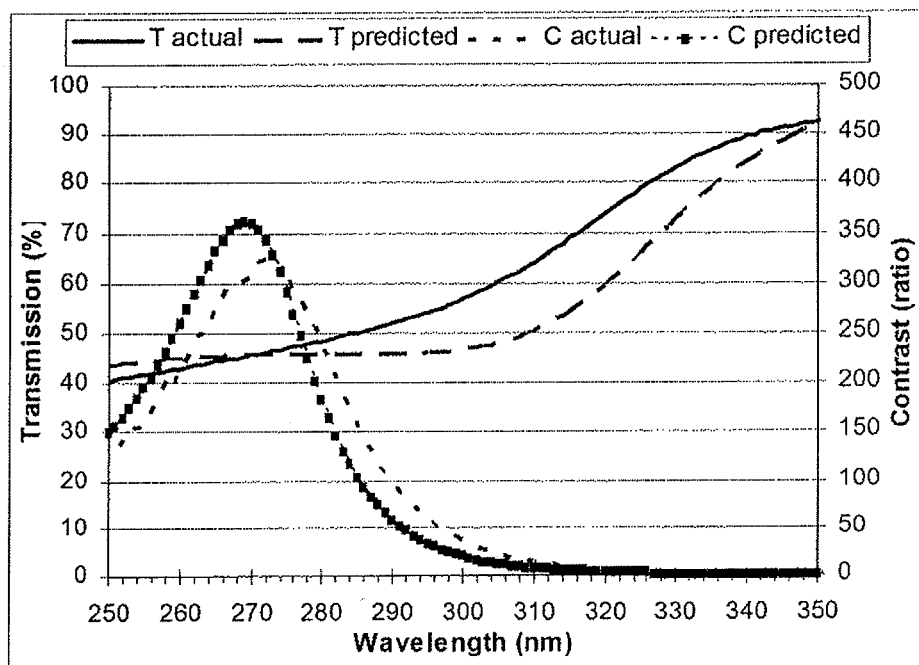
Figure 1D:
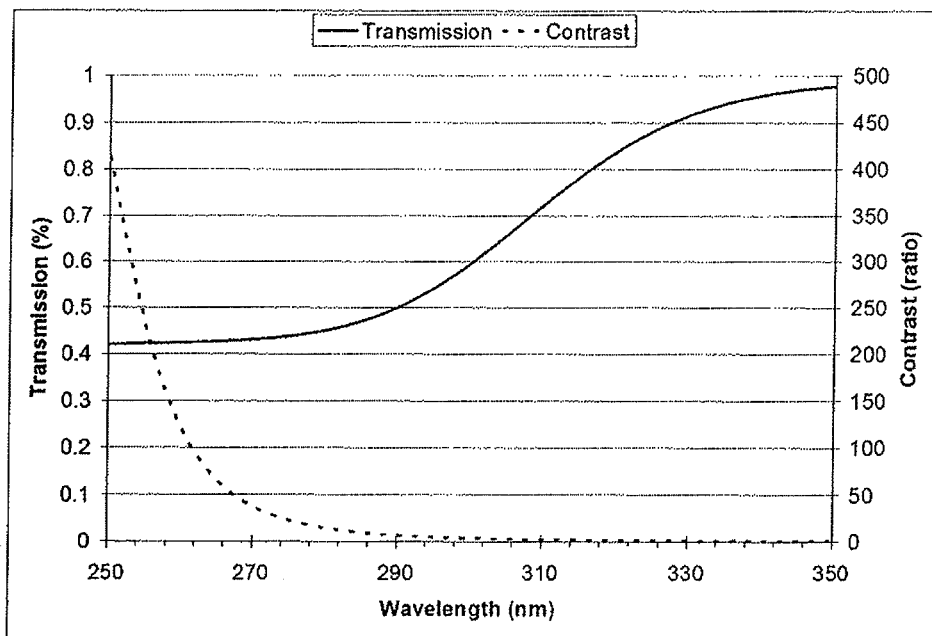
FIG. 1d is a graph of expected performance (calculated theoretically) of the polarizer of FIG. 1a with the ribs formed of Nb2O5.
Figure 1E:
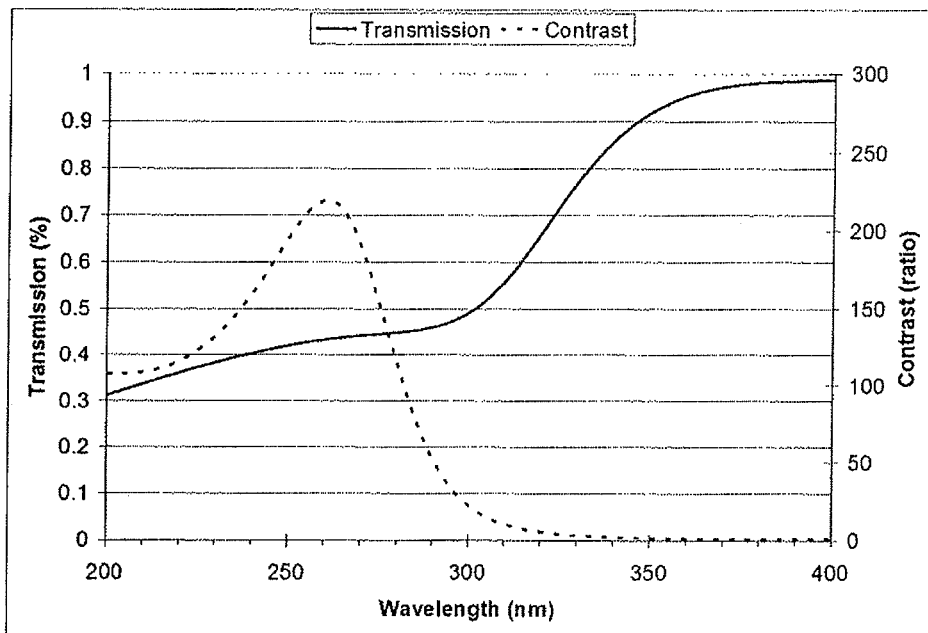
FIG. 1e is a graph of expected performance (calculated theoretically) of the polarizer of FIG. 1a with the ribs having a period of 100 nm.

Referring to FIG. 1f, the actual performance, transmission and contrast, of the polarizer 10 is shown. It can be seen that the actual performance is similar to the expected performance, the polarizer having a transmission greater than 40%.

Example 2

Referring to FIG. 4a, a second non-limiting example of an absorptive, inorganic and dielectric UV polarizer 10d is shown.

The polarizer 10d has a stack of film layers 18a-f disposed over a substrate 22. The film layers are formed of inorganic and dielectric materials, namely alternating layers of silicon dioxide ($SiO_2$)(n≈1.6, k≈0 at 266 nm) and titanium dioxide ($TiO_2$)(n≈2.7, k≈1.3 at 266 nm). Thus, the layers alternate between higher and lower indices of refraction (n). Each layer has a thickness of 23 nm. Thus, the entire stack has a thickness ($t_{total}$) of approximately 138 nm. All of the film layers are discontinuous and form an array 26 of parallel ribs 30. Thus, all of the layers are discontinuous to create form-birefringent layers. The ribs have a pitch or period P of 118 nm, and a duty cycle (ratio of period to width) of 0.4 or width (w) of 71 nm.

Table 2 shows the performance for the polarizer 10d of FIG. 4 with incident UV light with a wavelength (λ) of 266 nm at an angle of incidence of 0°.

TABLE 2

Example 2

| Pitch, material | Wavelength 266 nm | |
|---|---|---|
| | 120 nm, TiO2 | 120 nm, Nb2O5 |
| Incident Angle | 0 | 0 |
| p-transmission (Tp) | 45.6% | 51.0% |
| p-reflection (Rp) | 5.5% | 2.1% |
| s-transmission (Ts) | 0.13% | 0.82% |
| s-reflection (Rs) | 18.6% | 19.2% |
| Contrast Transmission (CT) | 344 | 61 |
| Contrast Reflection (CR) | 3.4 | 9.3 |

From Table 2, it can again be seen that the UV polarizer provides sufficient optical performance as described to be of great utility in the UV spectrum.

From the above examples, it can be seen that an effective UV polarizer can have a period less than 120 nm and can be operable over a useful portion of the UV spectrum.

Figure 5A:
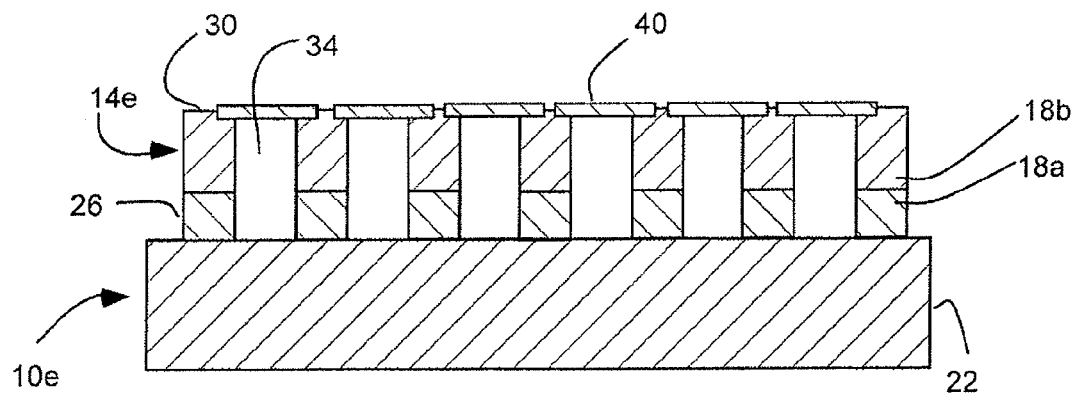
FIG. 5a is a cross-sectional schematic side view of another absorptive, inorganic and dielectric grid polarizer in accordance with another embodiment of the present invention.
Figure 5B:
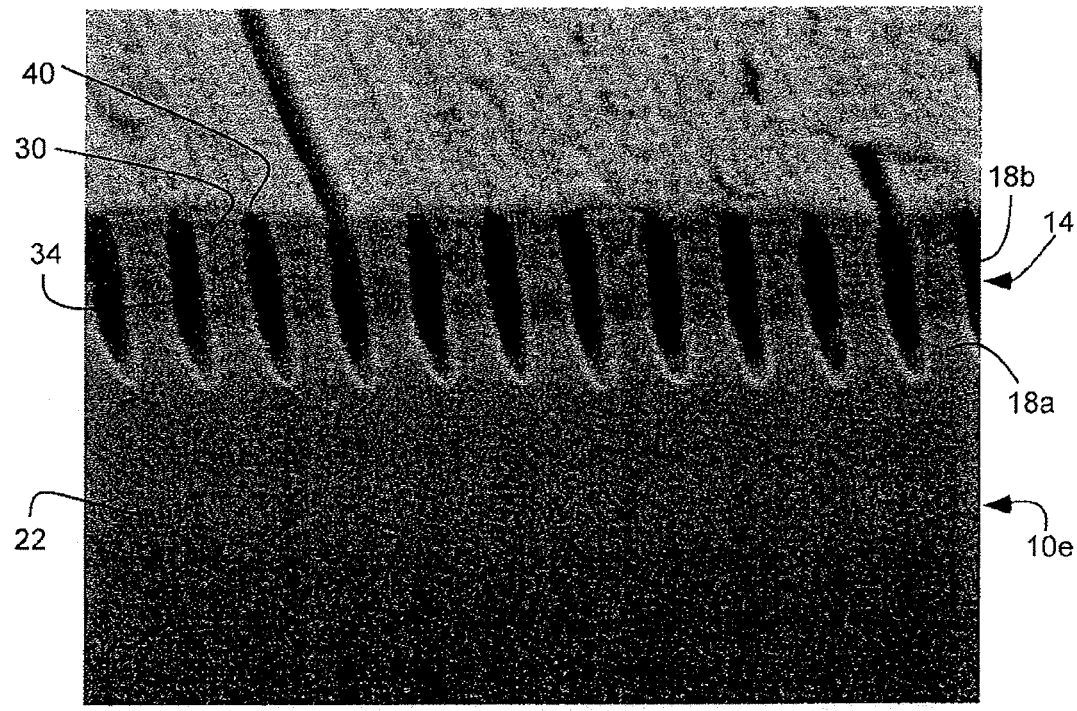

Referring to FIGS. 5a and 5b, another absorptive, inorganic and dielectric grid polarizer, or polarizing beam splitter, indicated generally at 10e, is shown in an exemplary implementation in accordance with the present invention. The above description is incorporated by reference. The polarizer 10e includes a planarizing layer 40 disposed over the ribs 30 and spanning the gaps 34. The planarizing layer can substantially cover the gaps and substantially prevent other materials from entering the gaps so that air is substantially maintained in the gaps. The planarizing layer 40 can be useful in disposing another layer over the ribs, or attaching the polarizer to another optical component. The planarizing layer 40 can include titanium fluorides (TiFx). Referring to FIG. 5b, this exemplary implementation was fabricated by forming one of the form-birefringent layers by etching into the substrate.

Figure 5C:
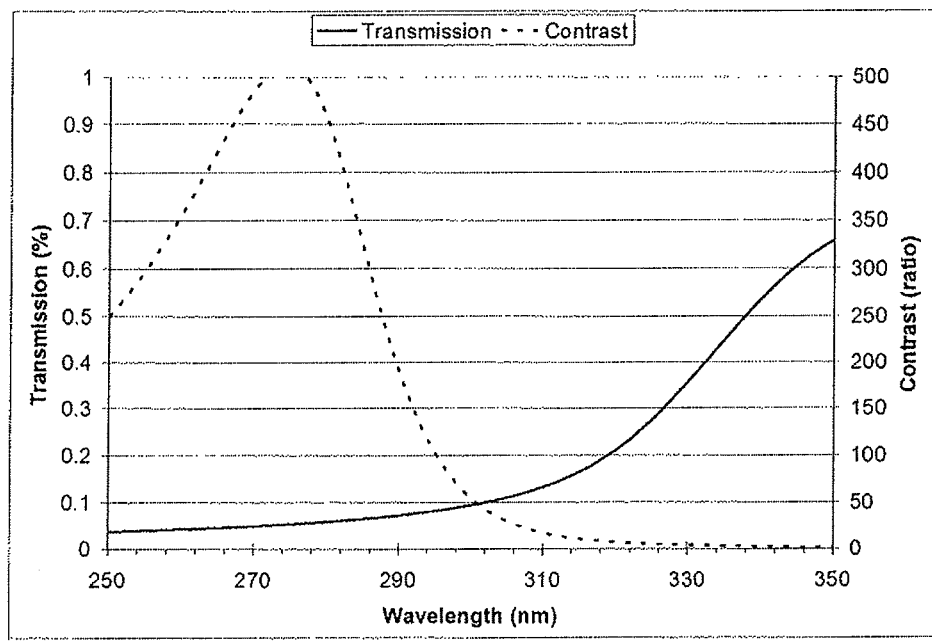

Referring to FIG. 5c, the predicted performance of the polarizer 10e of FIGS. 5a and 5b is shown. It can be seen that the polarizer 10e has a lower transmission which increases above about 310 nm.

Figure 6:
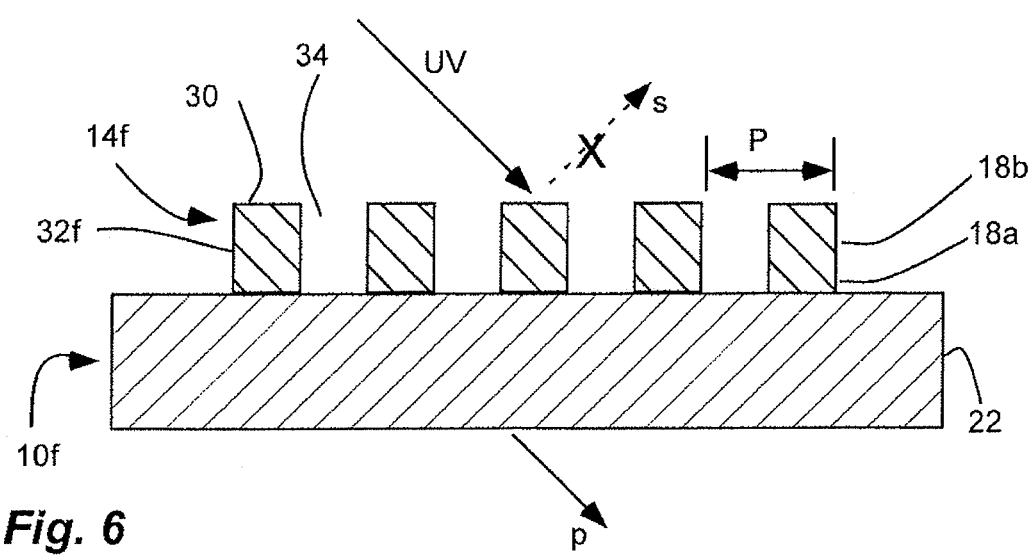
FIG. 6 is a cross-sectional schematic side view of another absorptive, inorganic and dielectric grid polarizer in accordance with another embodiment of the present invention.

Referring to FIG. 6, another absorptive, inorganic and dielectric grid polarizer, or polarizing beam splitter, indicated generally at 10f, is shown in an exemplary implementation in accordance with the present invention. The above description is incorporated by reference. The polarizer 10f includes at least one layer that is discontinuous to form a form-birefringent layer with a grid 32f having a parallel array of ribs 30 formed of a material that is both dielectric and absorptive in the ultra-violet spectrum. Thus, the grid defines a polarizing, dielectric and absorbing grid or layer. While it is believed that this embodiment may not perform as well as the above embodiments, it is believed that it can meet certain minimum performance requirements.

A method for forming a polarizer such as those described above includes obtaining a substrate 22. As described above, the substrate can be fused silica glass. In all aspects, the substrate would be chosen to be transparent to the desired wavelength of electromagnetic radiation. The substrate may be cleaned and otherwise prepared. A first continuous layer 18a is formed over the substrate with a first inorganic, dielectric optically transmissive (in the ultra-violet spectral range) material having a first refractive index. A second continuous layer 18b is formed over the first continuous layer with a second inorganic, dielectric optically absorptive (in the ultra-violet spectral range) material having a second refractive index. Either layer can be chosen to be of material which exhibits strong optical absorption to the incident UV light. Subsequent continuous layers can be formed over the second layer. The first and second layers, as well as the subsequent layers, can be formed by vacuum deposition, chemical vapor deposition, spin coating, etc., as is known in the art. The continuous layers, or at least the first or second continuous layers, are patterned to create two discontinuous layers with an array of parallel ribs defining at least one form birefringent layer. In addition, all the continuous layers can be patterned to create discontinuous layers. The layers can be patterned by etching, etc., as is known in the art.

The grid polarizer can be disposed in a beam of light to substantially reflect and absorb the s-polarization while substantially transmitting the p-polarization with a small amount of energy being absorbed.

Figure 7:
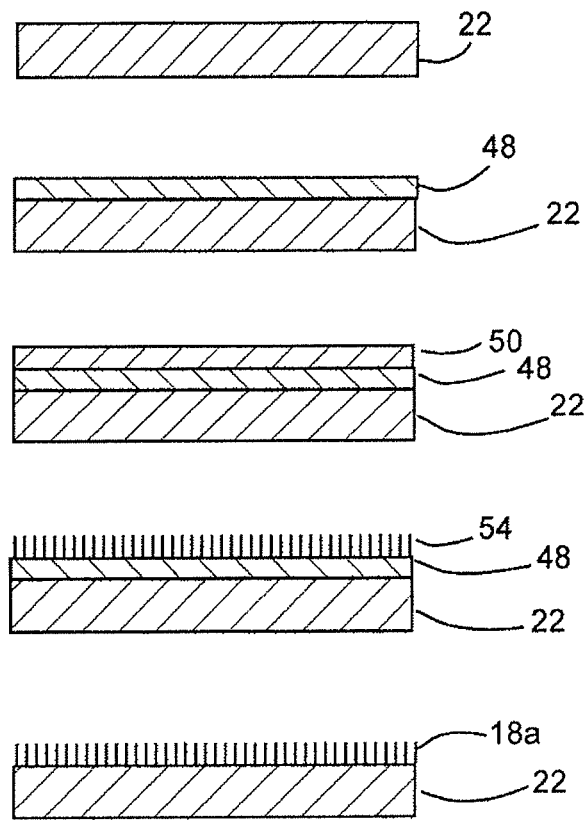

Referring to FIG. 7, another method is illustrated for forming an inorganic, dielectric grid polarizer, such as those above. The method is similar to the method described above which is incorporated by reference. A substrate 22 is obtained or provided. A first continuous layer 48 is formed over the substrate 22 with a first inorganic, dielectric material having a first refractive index. The first continuous layer can be patterned to create a discontinuous layer with an array of parallel ribs defining at least one form birefringent layer. The patterning can be accomplished by depositing an etch mask 50. The etch mask can then be patterned lithographically 54. The layer 48 can then be etched through the patterned etch mask 54. The etch mask 54 can be removed leaving a patterned layer 18a. A second continuous layer is formed over the first discontinuous layer with a second inorganic, dielectric material having a second refractive index. Another continuous layer can be formed over the second layer, and patterned to form a second discontinuous layer. Thus, patterning includes patterning less than all of the layers so that at least two adjacent layers include a continuous layer and a discontinuous layer.

In another aspect, the second continuous layer can be formed over the first, and the second continuous layer patterned.

Figure 8:
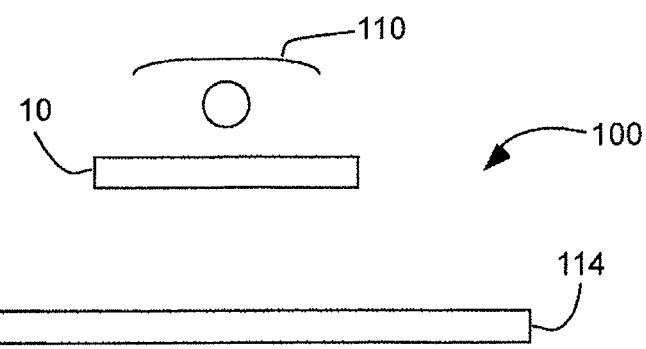
FIG. 8 is a schematic view of an ultra-violet exposure system using a polarizer of FIG. 1a in accordance with an embodiment of the present invention.

Referring to FIG. 8, a polarizer as described above (represented by 10) can be used in an ultra-violet exposure system 100. The system 100 can include an ultra-violet light source 110 that directs a UV beam at the polarizer 10, which transmits a polarized UV beam to an exposure target 114.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An absorptive, ultra-violet, inorganic, and dielectric grid polarizer device, the device comprising:
   a) a substrate;
   b) an absorptive layer disposed over the substrate including an optically absorptive material to an ultra-violet spectrum;
   c) the absorptive layer being formed of a material that is both inorganic and dielectric;
   d) the absorptive layer having a different refractive index than a refractive index of the substrate;
   e) the absorptive layer being discontinuous to form a form-birefringent layer with an array of parallel ribs having a period less than 400 nm
   f) a transmissive layer disposed over the substrate, the transmissive layer:
      i) being formed of a material that is both inorganic and dielectric;
      ii) being formed of a material that is optically non-absorptive to the ultra-violet spectrum;
      iii) having a different refractive index than the refractive index of the absorptive layer; and
      iv) being discontinuous to form a form-birefringent layer with an array of parallel ribs, the ribs of the transmissive layer:
         1) have a period less than 400 nm; and
         2) are substantially aligned with ribs of the absorptive layer.

2. The device of claim 1, wherein the optically absorptive material is selected from the group consisting of: cadmium telluride, germanium, lead telluride, silicon oxide, tellurium, titanium dioxide, silicon, cadmium sulifide, zinc selenide, zinc sulfide, and combinations thereof.

3. The device of claim 1, wherein the transmissive layer is disposed between the absorptive layer and the substrate.

4. The device of claim 3, wherein the ribs of the transmissive layer are formed integrally with the substrate and comprise ribs in the substrate.

5. The device of claim 1, wherein the absorptive layer is disposed between the transmissive layer and the substrate.

6. The device of claim 1, wherein the transmissive layer includes silicon dioxide and the absorptive layer includes titanium dioxide.

7. The device of claim 1, further comprising a third layer, the third layer:
   a) having a different refractive index than the refractive index of the absorptive layer;
   b) being discontinuous to form a form-birefringent layer with an array of parallel ribs, the ribs of the third layer:
      i) have a period less than 400 nm;
      ii) are substantially aligned with ribs of the absorptive layer and the transmissive layer;
      iii) are formed integrally with the substrate and comprise ribs in the substrate.

8. The device of claim 7, wherein the absorptive layer is disposed between the transmissive layer and the third layer.

9. The device of claim 7, wherein the transmissive layer is disposed between the absorptive layer and the third layer.

10. The device of claim 1, wherein the device substantially transmits one polarization orientation and substantially absorbs the other polarization orientation, in the ultra-violet spectrum.

11. The device of claim 10, wherein the device has a transmitted contrast ratio greater than 20:1 and a transmission efficiency greater than 30%.

12. An absorptive, ultra-violet, inorganic and dielectric grid polarizer device, comprising:
   a) a substrate;
   b) a stack of at least two layers disposed over the substrate including an absorptive layer and a transmissive layer;
   c) each layer of the stack being formed of a material that is both inorganic and dielectric;
   d) adjacent layers of the stack having different refractive indices;
   e) all of the layers of the stack being discontinuous to form form-birefringent layers with an array of parallel ribs having a period less than approximately 400 nm, the period and the different refractive indices causing the stack to substantially polarize an incident ultra-violet beam into two orthogonal polarization orientations and transmitting or reflecting one of the polarization orientations;
   f) the absorptive layer being formed of an optically absorptive material for an ultra-violet spectrum to substantially absorb another of the polarization orientations;
   g) the transmissive layer is disposed between the absorptive layer and the substrate;
   h) the transmissive layer is formed of an optically transmissive, non-absorptive material to the ultra-violet spectrum; and
   i) ribs of the transmissive layer are formed integrally with the substrate and comprise ribs in the substrate.

13. The device of claim 12, wherein the transmissive layer includes silicon dioxide and the absorptive layer includes titanium dioxide.

14. The device of claim 12, wherein the device has a transmitted contrast ratio greater than 20:1 and a transmission efficiency greater than 30%.

15. The device of claim 12, wherein the optically absorptive material is selected from the group consisting of: cadmium telluride, germanium, lead telluride, silicon oxide, tellurium, titanium dioxide, silicon, cadmium sulifide, zinc selenide, zinc sulfide, and combinations thereof.

16. The device of claim 12, wherein the stack of at least two layers includes a plurality of alternating layers of optically non-absorptive material and optically absorptive material with at least two layers of optically non-absorptive material and at least two layers of optically absorptive material.

17. The device of claim 12, further comprising a third planarization layer disposed over the ribs and gaps defined between the ribs.

18. The device of claim 12, wherein the stack of at least two layers includes at least three layers, and a third layer in the stack:
   a) has a different refractive index than the refractive index of the absorptive layer; and
   b) is discontinuous to form a form-birefringent layer with an array of parallel ribs having a period less than approximately 400 nm, the ribs of the third layer being substantially aligned with ribs of the absorptive layer and the transmissive layer.

19. The device of claim 18, wherein the absorptive layer is disposed between the transmissive layer and the third layer.

* * * * *